Patented June 15, 1954

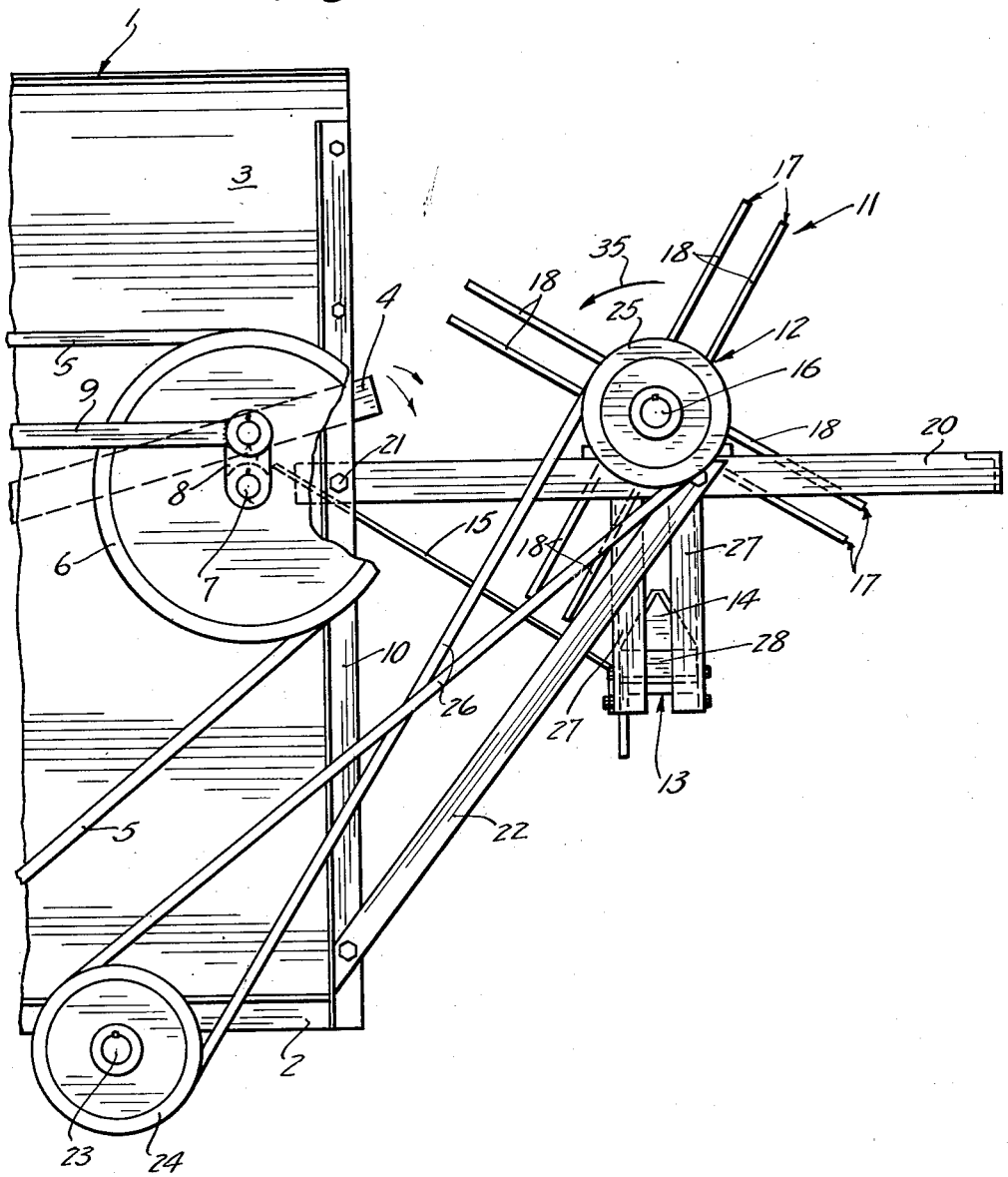

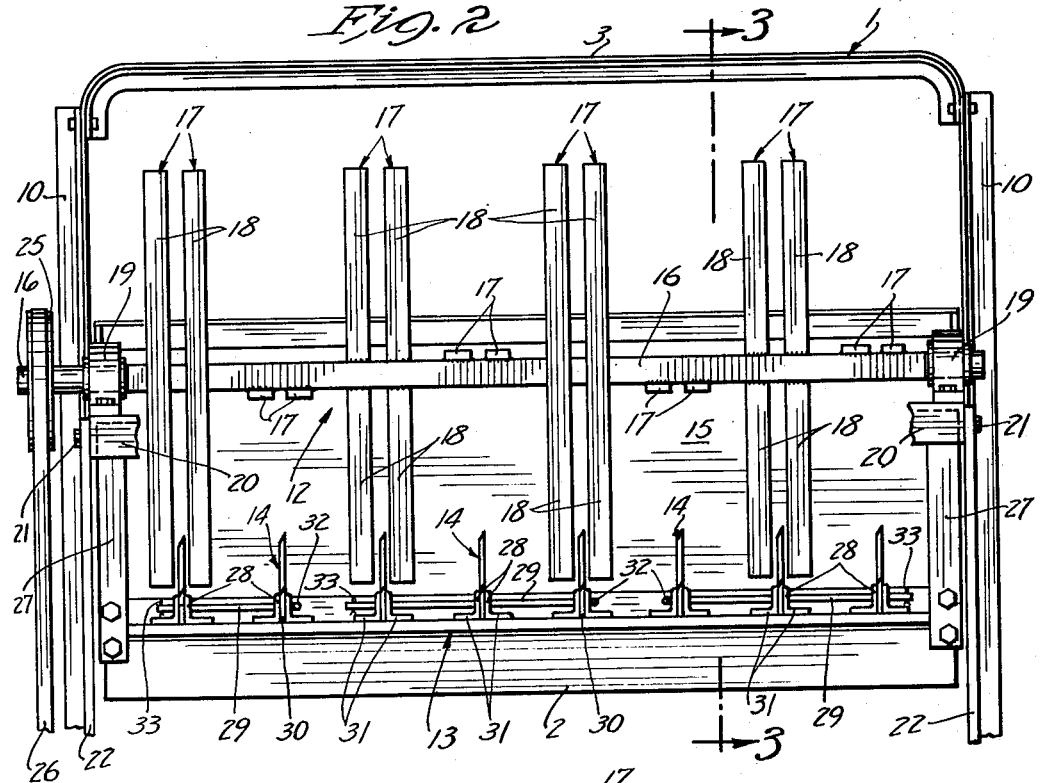
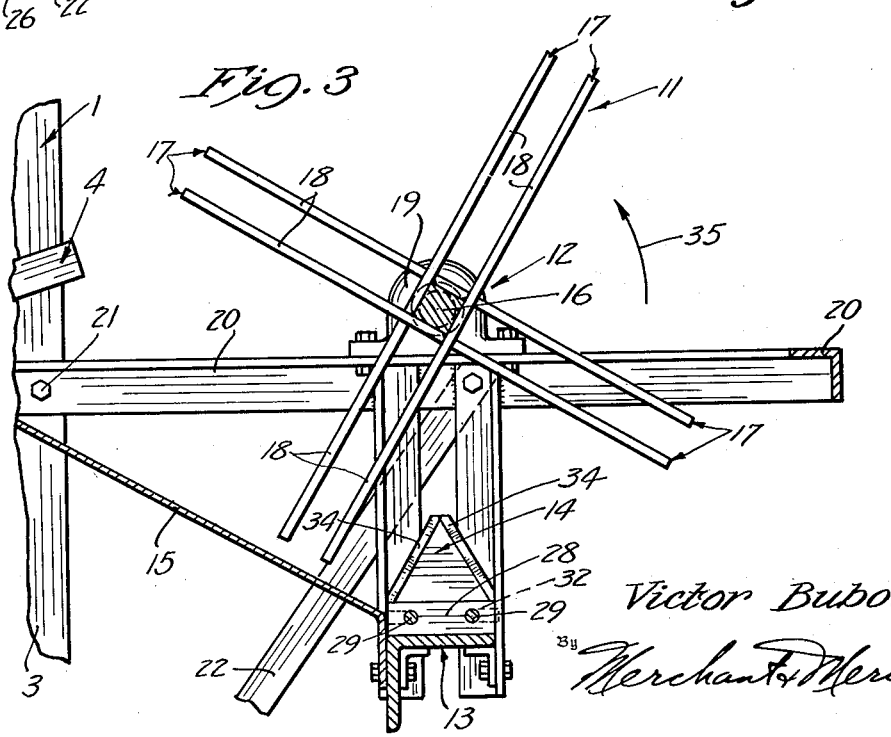

2,681,091

UNITED STATES PATENT OFFICE 2,681,091

STRAW COMMINUTING MACHINE HAVING REVERSIBLE STATIONARY CUTTING BLADE

Victor Buboltz, Hector, Minn.

Application March 1, 1951, Serial No. 213,347

1 Claim. (Cl. 146—164)

My present invention relates to a comminuting machine, which is particularly adapted for use in the comminution of straw and analogous material. While the machine of the present invention is adapted for a wide range of application, it is, nevertheless, particularly adapted for use in combination with and as an attachment to machines known in the agricultural arts as "combines." Generally speaking, combines are mobile, multiple-purpose machines which, when drawn over a field of standing grain, progressively cut and thresh the same; the grain berries being delivered to a suitable delivery point for collection independently of the straw, and the straw being discharged in another delivery point for collection or redistribution over the ground from which it was cut. When my invention is applied to the so-called combines, it receives the straw from the discharge thereof, cuts the same into small pieces and scatters the same over that portion of the field from which it was cut. In this preferred application, the invention serves as a combined straw comminuting and redistributing machine, the redistributed comminution product of which is reduced to such relatively small lengths as to be readily plowed back into the soil where it will decompose rapidly and serve as an important soil-conditioning element.

An important object of the invention is a provision of a highly efficient but very simple and comparatively inexpensive machine of the general character described.

Another important objective of the invention is the provision, in comminuting mechanism of the kind involved a material impelling rotor and cooperating cutting knives, of improved knives and mounting means therefor whereby the cost and time consumed in servicing knives is greatly reduced. In accordance with the preferred embodiment of the invention illustrated, this important objective is achieved by providing a series of cutting blades each provided with two cutting edges, one of which is normally operative and faces in a direction opposed to the direction of rotation of the rotor, and the other of which is normally inoperative and faces in the direction of rotation of the rotor. In this improved arrangement, the blades are mounted for easy removal and replacement, and the blades are reversible in the mounting so as to allow either of the two cutting edges of each blade to be selectively orientated in operative position. This feature affords a great improvement, since the arrangement permits quick reversing, in the field, of the cutting blades, to present new cutting surfaces to the material impelling rotor, thereby making it unnecessary to tie up the machine for the purpose of servicing the cutting blades.

Another important objective of the invention is the provision of an improved rotor construction, which is extremely simple to construct, inexpensive to produce, but yet very efficient in use.

The above and other highly important objects and advantages of the invention will be made apparent from the following specification, claim and appended drawings.

In the accompanying drawings, like characters indicate like parts throughout the several views.

Referring to the drawings:

Fig. 1 is a fragmentary view in side elevation, with some parts broken away, showing a preferred embodiment of my invention applied to the rear or discharge end portion of a combined grain cutting and threshing machine;

Fig. 2 is a rear view, with some parts broken away, of the machine of Fig. 1; and Fig. 3 is an enlarged fragmentary sectional view, taken on the line 3—3 of Fig. 2.

In the drawings hereof, the rear end portion of a conventional mobile combine (a combined grain cutting and threshing machine) is indicated as an entirety by 1. Because only the rear end portion of the combine 1 is illustrated, the ground wheels of the machine are not in evidence. The rear end portion of the combine illustrated comprises a base frame 2 mounting a rearwardly-opening tunnel-forming housing structure 3, wherethrough straw is rearwardly discharged by means of a conventional reciprocatory conveyor mechanism 4. The conventional reciprocatory straw feeding mechanism 4 may be driven in any suitable manner, but for the purpose hereof may be assumed to be driven by power transmission mechanism comprising a power-driven belt 5, a cooperating belt pulley 6, a journalled crank shaft 7, a crank 8 mounted fast on the shaft 7, and a pitman arm 9 connected to the free end of crank 8. It should be understood that so-called combines of the type illustrated normally discharge the straw in long lengths directly on the ground as the machine progresses over a field of standard grain, and is very often subsequently removed from the stubble field or burned because of the difficulty encountered in plowing under uncut or long lengths of straw. By reference particularly to Figs. 1 and 2, it will be seen that the tunnel-forming housing structure 3 is reinforced at its sides by vertical frame elements 10 extending upwardly from the base frame 2.

My improved straw chopping or comminuting and redistributing mechanism is indicated as an entirety by 11 and, as shown, is mounted directly on the rear or discharge end portion of the conventional combine to receive straw directly from the reciprocatory straw feeding mechanism 4 thereof. In its preferred embodiment illustrated, my improved comminuting and redistributing mechanism or machine comprises straw-impelling rotor 12, a knife bed 13, a plurality of double-edged cutting knives 14, and an apron-like straw delivery chute 15. The rotor 12 comprises a power-driven rotor shaft 16 and a plurality of laterally-spaced parallel pairs of bars 17. The bars 17 of each pair thereof are centrally welded or otherwise secured to an outer surface of the shaft 16, so that each said bar 17 affords oppositely-projecting impeller arms 18. By reference particularly to Figs. 2 and 3, it will be seen that the knives 14 are mounted outside of but project into the field of rotation of the impelling arms 18 of the rotor 12. By reference particularly to Fig. 2, it will be seen that there is provided one cooperating pair of rotor bars 17 for each cutting blade 14 and that these are spaced to receive a cooperating knife 14 between the free end portions of the impeller arms 18 provided by each pair of bars 17. In the preferred arrangement illustrated, and as shown best in Figs. 2 and 3, there are eight pairs of bars 17, and adjacent pairs of said bars are angularly spaced 90° on the shaft 16, so that the unbalance produced by the radial offset of each pair of bars 17 from the axis of shaft 16 will be counterbalanced by another pair of bars 17 angularly spaced 180° therefrom. In the preferred arrangement illustrated, the intermediate portion of shaft 16 is square to facilitate anchoring of the bars 17 thereon.

The rotor shaft 16 is journalled adjacent its opposite ends in bearings 19 mounted on a horizontal auxiliary frame 20, the forwardly-projecting ends of which are anchored to the upright frame elements 10 of the combine by bolts or the like 21. The rearwardly-projecting frame 20 is supported by diagonal braces 22 from the upright frame elements 10 of the combine, as shown best in Fig. 1.

The rotor shaft 16 is driven at high speed from a power take-off shaft 23 of the combine through power transmission connections comprising a pulley 24 fast on the power take-off shaft 23, a similar pulley 25 fast on one projected end of the rotor shaft 16 and a V-belt 26 running over the pulleys 24 and 25.

The knife bed 13 extends parallel to the shaft 16, is located just outside of the field of rotation of the material-impelling arms 18 of the rotor, and is mounted on the auxiliary frame 20 through the medium of depending frame arms 27. The several double-edge cutting blades 14 are securely but removably anchored on the knife bed 13 by means of upstanding anchoring flanges 28 and cooperating anchoring pins or rods 29. By reference particularly to Fig. 2, it will be seen that there is a pair of these upstanding anchoring flanges 28 for each blade 14 and that these are spaced to form narrow sockets 30 for snugly receiving the base portions of the knife blades 14. In the preferred embodiment of the invention illustrated, the socket-forming anchoring flanges 28 are formed by the upstanding flanges of angle irons having their base flanges 31 rigidly secured to the knife bed 13 (see particularly Fig. 2).

The knife blades 14 are disposed with their cutting edges in planes generally radially of the shaft 16 and have relatively wide base portions which are seated in the channels or sockets 30 of the bed 13 and are each anchored in place by a laterally-spaced pair of anchoring pins 29 passing through aligned apertures in the anchoring flanges 28 and seated portions of the knives 14. Desirably, and as shown, each pair of anchoring pins 29 extend through and serve to anchor in position a plurality of adjacent knife blades 14; each such pin being provided at one end with an offset head 32 and at its other end with a cotter pin or the like 33. By reference particularly to Fig. 3, it will be seen that projecting upper end portions of the knife blades 14 have a generally inverted V shape to provide upwardly diverging opposite cutting edges 34, one of which is always operatively positioned and faces in a direction opposed to the direction of rotation of the impeller arms 18, and the other of which is always inoperatively positioned and faces in the direction of rotation of the impeller arms 18 (see particularly Fig. 2), wherein the direction of rotation of the rotor and its impeller arms 18 is indicated by direction arrows 35. Actually, the cutting blades 14 are conventional sickle bar blades which are readily obtainable on the open market and may be sharpened in similar manner.

The chute-like apron 15 is anchored to the knife bed 13, as shown best in Fig. 3, and projects outwardly and forwardly to a point beneath the discharge end of the reciprocatory straw feeding mechanism 4, so that the straw dropped thereon by the reciprocatory feeding mechanism 4 will be fed by gravity into the field of rotation of the impeller arms 18 at a point in front of the several knife blades 14. Of course, the straw thus fed into the field of rotation of the impeller arms 18 will be rapidly impelled by the rotating impeller arms 18 past the operatively-positioned cutting edges 34 of the knife blades 14, which will cut the same into relatively short lengths and then scatter and redistribute the same over the stubble field from which the straw was cut. Of course, it will be understood that the lengths to which the straw will be cut can be controlled by variable spacing of the knives 14 and cooperating pairs of impeller arms 18. As heretofore pointed out, if the operatively-positioned cutting edges 34 of the knife blades 14 become dull in the field, the operator can readily restore the machine to full efficiency by merely withdrawing the elongated anchoring pins 29, turning the knife blades 14 180° and reinserting the anchoring pins 29. By this simple expedient, the operator is able to maintain the machine operating at high efficiency for long periods without tying up the machine while the blades are sharpened.

The machine illustrated can be produced very inexpensively and has proven highly efficient and desirable under severe surface conditions.

My invention has been thoroughly tested and found to be completely satisfactory for the accomplishment of the objectives set forth; and while I have shown a commercial embodiment of my improved device, it will be understood that the same is capable of modification without departure from the scope and spirit of the invention as defined in the claim.

What I claim is:

In a machine of the class described, a supporting frame, a power driven rotor comprising a horizontal square shaft rotatably journalled on said frame and a plurality of pairs of laterally projecting impeller blades spaced apart axially of the shaft and secured thereto intermediate their ends, the blades of each pair thereof being parallel and in closely spaced relation and the pairs of blades from one end of the shaft to the other being successively secured to a next adjacent side thereof, whereby the several pairs of blades are substantially balanced about the axis of the shaft, a fixed knife bed supported by said frame in parallel relation to said shaft and disposed outwardly of the field of rotation of the impeller blades, the improvement which includes in combination with said impeller blades and bed, a plurality of pairs of angle irons secured to said bed including parallel flanges projecting from the bed toward said rotor and providing with said knife bed receiving sockets, the pairs of angle irons being spaced along the bed in conformity with the spacing of said pairs of impeller blades, a cutting knife having a base portion received in each socket and a cutting portion projecting within the field of rotation of the impeller blades and between the impeller blades of a respective pair thereof, the said flanges and the base portions of the knives having aligned apertures and anchoring rods removably disposed within said aligned apertures for retaining the knives in operative position.

References Cited in the file of this patent

UNITED STATES PATENTS

| Number | Name | Date |
|---|---|---|
| 105,344 | Lee | July 12, 1870 |
| 304,162 | Bricker | Aug. 26, 1884 |
| 317,150 | Laqua | May 5, 1885 |
| 563,006 | Barnes | June 30, 1896 |
| 641,869 | Klock et al. | Jan. 23, 1900 |
| 777,339 | Gamble | Dec. 13, 1904 |
| 999,932 | Wetterhold | Aug. 8, 1911 |
| 1,015,743 | Roberts | Jan. 23, 1912 |
| 2,327,893 | Hobson | Aug. 24, 1943 |
| 2,446,095 | Miller | July 27, 1948 |
| 2,590,056 | Whitacre | Mar. 18, 1952 |

FOREIGN PATENTS

| Number | Country | Date |
|---|---|---|
| 806,064 | Germany | June 11, 1951 |